H. O. BARTON.
SAFETY DEVICE FOR THE STARTING CRANKS OF MOTOR VEHICLES.
APPLICATION FILED OCT. 1, 1917.
1,267,497. Patented May 28, 1918.
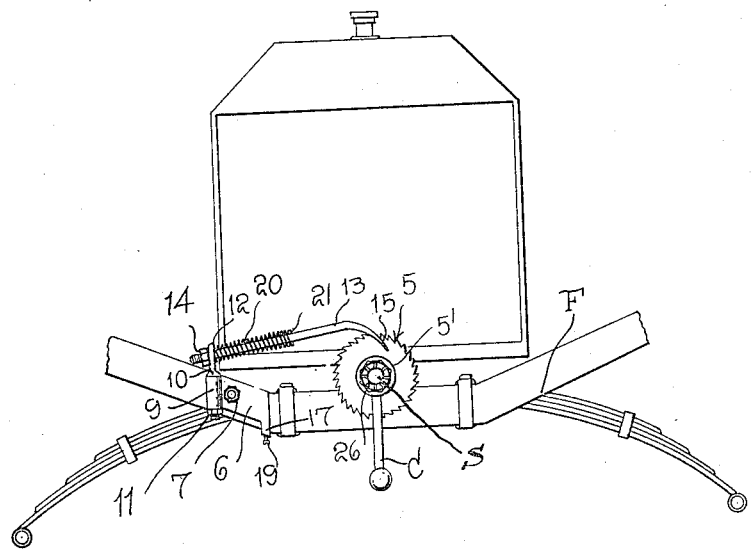
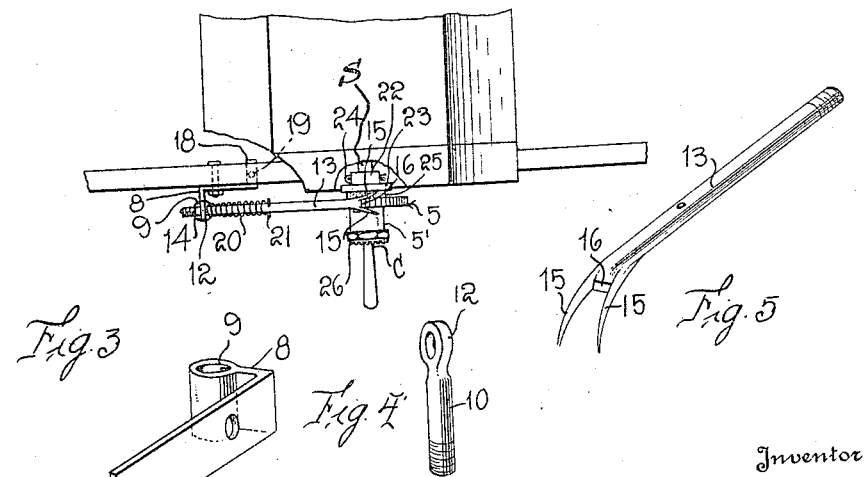
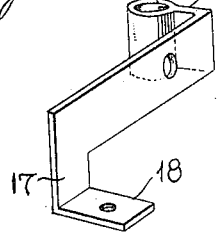
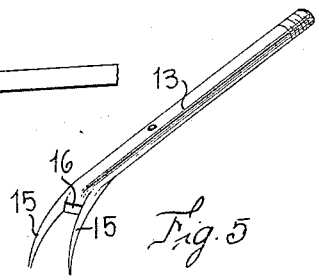
Inventor
H. O. Barton
By Watson E. Coleman
Attorney

UNITED STATES PATENT OFFICE.

HARRY O. BARTON, OF BLOOMFIELD, IOWA.

SAFETY DEVICE FOR THE STARTING-CRANKS OF MOTOR-VEHICLES.

1,267,497.  Specification of Letters Patent.  Patented May 28, 1918.

Application filed October 1, 1917. Serial No. 194,229.

*To all whom it may concern:*

Be it known that I, HARRY O. BARTON, a citizen of the United States, residing at Bloomfield, in the county of Davis and State of Iowa, have invented certain new and useful Improvements in Safety Devices for the Starting-Cranks of Motor-Vehicles, of which the following is a specification, reference being had to the accompanying drawings.

This invention relates to an improved safety device for the starting crank of a vehicle motor, and has for its primary object to provide a very simple device of this character which will prevent the sudden reverse rotation of the starting crank upon backfiring of the engine and thus obviate possible injury to the operator.

It is another and more particular object of the invention to provide a device for the above purpose embodying a spring-held member adapted to co-act with a part fixed on the starting shaft to yieldingly prevent rotation of said shaft in one direction, and improved means for adjustably mounting said member upon the front cross bar of the vehicle frame.

It is a further general object of the invention to provide a safety device for motors as above characterized, which consists of relatively few parts of very simple form and which are capable of manufacture at small cost and can be easily and quickly applied to the ordinary motor vehicle.

With the above and other objects in view, my invention consists in the novel features of construction, combination, and arrangement of parts to be hereinafter more fully described, claimed, and illustrated in the accompanying drawing, in which, Figure 1 is a front elevation illustrating my improved safety device applied to the vehicle;

Fig. 2 is a plan view; and

Figs. 3, 4 and 5 are perspective views of the detail parts.

Referring in detail to the drawing, F designates the front cross bar of the motor vehicle frame upon which the engine crank shaft S is mounted in any ordinary or approved manner. Upon the forward end of this shaft, the ratchet wheel 5 is loosely engaged, said ratchet wheel preferably being integral with the operating crank C. A sleeve 22 is provided with a flange 23 on one end, said sleeve being fixed to the shaft S by means of a pin or key indicated at 24. Between the flange 23 and the rear face of the ratchet wheel 5, an annulus 25 of leather or other suitable friction material is engaged by the shaft S. The forward end of the shaft S is threaded to receive a nut 26 which is adapted for bearing engagement with the hub or sleeve 5' projecting from one side of the ratchet 5.

On the bar F at the left hand side of its center, a plate 6 is loosely mounted for pivotal movement upon the bolt 7 secured in said frame bar. One end of this plate is angularly bent, as at 8, and extends forwardly, said angular end of the plate terminating in a vertically disposed sleeve 9. In this sleeve 9, the bolt 10 is loosely engaged and capable of rotation, a retaining nut 11 being threaded on the lower end of the bolt. The upper end of the bolt is formed with an eye 12 and through this eye one end of a rod 13 is loosely engaged, said end of the rod being threaded to receive a nut 14 engaged against one side of the eye 12.

The other end of the rod 13 is formed with a longitudinally curved fork or bifurcation 15, and between the inner ends of the fork arms the rod is provided with the beveled edge 16 which is adapted for engagement with the teeth of the ratchet 5.

The plate 6, at its other end, is also formed with an angular, downwardly extending arm 17 having a rearwardly projected end portion 18. This end portion is provided with a threaded opening to receive the set screw 19 by the adjustment of which the plate 6 may be rocked upon the bolt 7 and the rod 13 positioned at the desired angle.

A coil spring 20 is engaged upon the rod 13 and bears at one of its ends against the eye 12 on the upper end of the rod 10 and at its other end against a transverse pin 21 fixed in the rod 13. This spring normally acts to urge the forked end 15 of the rod 13 toward the ratchet and hold the beveled or inclined edge 16 of said rod in engagement with the ratchet teeth.

From the above description, the operation of the device will be readily understood. In starting the engine, the nut 26 is adjusted to force the ratchet wheel 5 rearwardly on the shaft and cause a tight frictional contact of said ratchet disk and the flange 23 on the fixed sleeve 22 with the interposed leather washer or annulus 25, In this adjustment of the ratchet, the forked end of the rod 13 moves with the ratchet 5, the bolt 10 turning freely in the sleeve 9. The fork arms which engage on opposite sides of the ratchet will effectually prevent the casual disengagement of the end 16 of the rod from the ratchet teeth. As above stated, the set screw 19 may be adjusted against the lower edge of the frame bar F so as to rock the plate 6 and dispose the rod at the proper inclination. By the provision of this adjusting means for the plate 6, the device may be operatively applied to ratchets of various diameters with which different makes of machines may be equipped so as to insure the free sliding movement of the rod 13 through the eye 12 without binding against the latter, and thus provide for the full compression of the spring 20 under the thrust of said rod. The adjusting screw 19 also serves to hold the plate 6 rigid on the frame and prevent oscillation thereof in the movement of the rod 13. The crank C is turned in the usual manner, and when the rotation of this crank is suddenly reversed upon backfiring of the engine, the ratchet 5 will force the rod 13 to the left, which movement is yieldingly retarded by the spring 20. The crank shaft S will, of course, rotate freely within the hub or sleeve 5' on the ratchet wheel 5. Thus, the rerotation of the crank C is prevented so that the crank will not strike and injure the operator. The device as above described may be readily applied to various makes of automobiles, but is particularly designed for use in connection with the Ford automobile. The several parts are of relatively simple form and it is, therefore, manifest that the device as a whole can be produced at small manufacturing cost. It is also very durable, as well as efficient and serviceable in practical use.

While I have herein shown and described the preferred construction and arrangement of the several elements, it is to be understood that the device is susceptible of considerable modification therein and I, therefore, reserve the privilege of adopting all such legitimate changes as may be fairly embodied within the spirit and scope of the invention as claimed.

Having thus fully described my invention, what I desire to claim and secure by Letters Patent is:—

1. The combination with the starting shaft of a motor vehicle, of a ratchet thereon, a support mounted upon the vehicle frame, a rod axially movable upon the support and operatively engaged at one end with the ratchet teeth, a spring engaged on the rod and co-acting with the support to yieldingly hold the rod against movement away from the ratchet, and means for adjusting the support to angularly position the rod with respect to the ratchet.

2. The combination with the starting shaft of a motor vehicle, of a ratchet on the starting shaft, a plate pivotally mounted on the vehicle frame for movement in a vertical plane, a support rotatably mounted upon said plate, a rod axially movable upon the support and operatively engaged at one end with the teeth of the ratchet, a spring on said rod co-acting with the support to yieldingly urge the rod toward the ratchet, and means for vertically adjusting the pivoted plate to angularly position the rod with respect to the ratchet.

3. The combination with the starting shaft of a motor vehicle, of a ratchet on said shaft, a plate pivotally mounted on the machine frame for movement in a vertical plane and having a terminal sleeve at one side of its pivot, a vertical rod rotatably mounted in said sleeve and having an eye on its upper end, a second rod loosely movable through said eye and operatively engaged at one of its ends with the teeth of the ratchet, a spring on said rod yieldingly urging the same into operative engagement with the ratchet, and manually adjustable means mounted in the opposite end of said plate and co-acting with the frame to vertically move the plate upon its pivot and angularly position the rod with respect to the ratchet.

In testimony whereof I hereunto affix my signature in the presence of two witnesses.

HARRY O. BARTON.

Witnesses:
A. G. ANDERSON,
H. C. LEACH.